(12) United States Patent
Ogai et al.

(10) Patent No.: US 11,722,628 B2
(45) Date of Patent: Aug. 8, 2023

(54) INFORMATION PROCESSING APPARATUS AND NONVOLATILE STORAGE MEDIUM

(71) Applicant: D&P Media Co., Ltd., Chiba (JP)

(72) Inventors: Masanao Ogai, Chiba (JP); Atsuhiro Ogai, Chiba (JP)

(73) Assignee: D&P Media Co., Ltd., Chiba (JP)

( * ) Notice: Subject to any disclaimer, the term of this patent is extended or adjusted under 35 U.S.C. 154(b) by 0 days.

(21) Appl. No.: 17/903,624

(22) Filed: Sep. 6, 2022

(65) Prior Publication Data

US 2023/0112158 A1  Apr. 13, 2023

(30) Foreign Application Priority Data

Oct. 12, 2021 (JP) ................. 2021-167140

(51) Int. Cl.
  *H04N 1/60* (2006.01)
  *G01J 3/46* (2006.01)

(52) U.S. Cl.
  CPC ............ *H04N 1/6025* (2013.01); *G01J 3/462* (2013.01)

(58) Field of Classification Search
  CPC ....... H04N 1/6027; H04N 1/403; G01J 3/462; G06T 7/90
  USPC ................. 358/1.9, 2.1, 3.26, 3.23; 382/162
  See application file for complete search history.

(56) References Cited

U.S. PATENT DOCUMENTS

2011/0229023 A1*  9/2011  Jones ................. G06T 5/00
                                                     382/162

* cited by examiner

*Primary Examiner* — Jamares Q Washington
(74) *Attorney, Agent, or Firm* — Nakanishi IP Associates, LLC (57) ABSTRACT

An information processing apparatus (10) for evaluating the chromatic discriminability of content includes: a unit (S12) that converts the color space values of each of first and second verification points A and B on the content into Lab color space values; a unit (S13) that calculates the color difference and the lightness difference between the first and second verification points based on the Lab color space values; and a unit (S23, S24) that determines color-difference discriminability by comparing the color difference between the first and second verification points with a color-difference threshold, and determines lightness-difference discriminability by comparing the lightness difference between the first and second verification points with a lightness-difference threshold. Each of the color-difference threshold and the lightness-difference threshold is set to a value that depends on whether a region containing the first verification point and a region containing the second verification point are adjoining or not.

8 Claims, 10 Drawing Sheets

| VERIFICATION POINTS COMPARED | COLOR-VISION CHARACTERISTICS GROUP | DETERMINATION OF COLOR-DIFFERENCE DISCRIMINABILITY | DETERMINATION OF LIGHTNESS-DIFFERENCE DISCRIMINABILITY | COMPREHENSIVE DETERMINATION |
|---|---|---|---|---|
| A/B | GENERAL PEOPLE WITH NORMAL COLOR VISION (TYPE C) | ○ | × | × |
| | COLOR-BLIND PEOPLE (TYPE P) | ○ | ○ | |
| | COLOR-BLIND PEOPLE (TYPE D) | ○ | × | |
| | ELDERLY | ○ | × | |
| A/C | GENERAL PEOPLE WITH NORMAL COLOR VISION (TYPE C) | ○ | ○ | ○ |
| | COLOR-BLIND PEOPLE (TYPE P) | ○ | ○ | |
| | COLOR-BLIND PEOPLE (TYPE D) | ○ | ○ | |
| | ELDERLY | ○ | ○ | |
| B/C | GENERAL PEOPLE WITH NORMAL COLOR VISION (TYPE C) | ○ | × | × |
| | COLOR-BLIND PEOPLE (TYPE P) | × | × | |
| | COLOR-BLIND PEOPLE (TYPE D) | × | × | |
| | ELDERLY | ○ | × | |

Lab COLOR SPACE VALUE TABLE FOR GENERAL PEOPLE WITH NORMAL COLOR VISION

| COLOR NUMBER | Lab COLOR SPACE VALUES | | | CORRECTION FACTOR |
|---|---|---|---|---|
| | VALUE L* | VALUE a* | VALUE b* | |
| 1 | 21.0 | 1.0 | -31.0 | 1.0 |
| 2 | 57.0 | -11.0 | -40.0 | 0.9 |
| 3 | 77.0 | -20.0 | -29.0 | 1.1 |
| 4 | 55.0 | -25.0 | -26.0 | 0.75 |
| 5 | 87.0 | -16.0 | 36.0 | 0.8 |
| ... | | | | |
| 144 | 60.0 | 51.0 | 63.0 | 0.9 |

FIG.2B

Lab COLOR SPACE VALUE TABLE FOR COLOR-BLIND PEOPLE (TYPE P)

| COLOR NUMBER | Lab COLOR SPACE VALUES | | | CORRECTION FACTOR |
|---|---|---|---|---|
| | VALUE L* | VALUE a* | VALUE b* | |
| 1 | 25.0 | 5.0 | -31.0 | 1.1 |
| 2 | 61.0 | 4.0 | -30.0 | 1.1 |
| 3 | 77.0 | 3.0 | -19.0 | 1.1 |
| 4 | 55.0 | 2.0 | -27.0 | 1.2 |
| 5 | 86.0 | -4.0 | 36.0 | 0.9 |
| ... | | | | |
| 144 | 48.0 | -2.0 | 17.0 | 1.2 |

FIG.2C

Lab COLOR SPACE VALUE TABLE FOR COLOR-BLIND PEOPLE (TYPE D)

| COLOR NUMBER | Lab COLOR SPACE VALUES | | | CORRECTION FACTOR |
|---|---|---|---|---|
| | VALUE L* | VALUE a* | VALUE b* | |
| 1 | 25.0 | 5.0 | -31.0 | 1.1 |
| 2 | 58.0 | 5.0 | -35.0 | 1.2 |
| 3 | 74.0 | 2.0 | -21.0 | 1.25 |
| 4 | 39.0 | 5.0 | -36.0 | 1.2 |
| 5 | 93.0 | -4.0 | 40.0 | 1.0 |
| ... | | | | |
| 144 | 46.0 | -1.0 | 7.0 | 1.25 |

FIG.2D

Lab COLOR SPACE VALUE TABLE FOR ELDERLY

| COLOR NUMBER | Lab COLOR SPACE VALUES | | | CORRECTION FACTOR |
|---|---|---|---|---|
| | VALUE L* | VALUE a* | VALUE b* | |
| 1 | 15.0 | -6.0 | -15.0 | 1.2 |
| 2 | 46.0 | 28.0 | -9.0 | 1.2 |
| 3 | 61.0 | -27.0 | -0.0 | 1.25 |
| 4 | 43.0 | 15.0 | -2.0 | 1.2 |
| 5 | 70.0 | -16.0 | 45.0 | 1.1 |
| ... | | | | |
| 144 | 45.0 | 50.0 | 35.0 | 1.25 |

REFERENCE THRESHOLDS FOR ADJOINING REGIONS (BORDERING ON EACH OTHER)

| COLOR-VISION CHARACTERISTICS GROUP | COLOR DIFFERENCE($\Delta E76$) | LIGHTNESS DIFFERENCE($\Delta L$) |
|---|---|---|
| GENERAL PEOPLE WITH NORMAL COLOR VISION (TYPE C) | 30.0 | 15.0 |
| COLOR-BLIND PEOPLE (TYPE P) | 30.0 | 15.0 |
| COLOR-BLIND PEOPLE (TYPE D) | 30.0 | 15.0 |
| ELDERLY | 30.0 | 20.0 |

FIG.3A

REFERENCE THRESHOLDS FOR REGIONS LOCATED APART (NOT ADJOINING)

| COLOR-VISION CHARACTERISTICS GROUP | COLOR DIFFERENCE($\Delta E76$) | LIGHTNESS DIFFERENCE($\Delta L$) |
|---|---|---|
| GENERAL PEOPLE WITH NORMAL COLOR VISION (TYPE C) | 25.0 | 13.0 |
| COLOR-BLIND PEOPLE (TYPE P) | 25.0 | 14.0 |
| COLOR-BLIND PEOPLE (TYPE D) | 25.0 | 14.0 |
| ELDERLY | 25.0 | 18.0 |

| VERIFICATION POINT | COLOR-VISION CHARACTERISTICS GROUP | COLORIMETRY L*a*b* | | |
|---|---|---|---|---|
| | | VALUE L* | VALUE a* | VALUE b* |
| A | GENERAL PEOPLE WITH NORMAL COLOR VISION (TYPE C) | 49 | 75 | 59 |
| A | COLOR-BLIND PEOPLE (TYPE P) | 44 | 9 | 48 |
| A | COLOR-BLIND PEOPLE (TYPE D) | 55 | 14 | 54 |
| A | ELDERLY | 46 | 67 | 61 |
| B | GENERAL PEOPLE WITH NORMAL COLOR VISION (TYPE C) | 59 | 1 | -1 |
| B | COLOR-BLIND PEOPLE (TYPE P) | 59 | 0 | -3 |
| B | COLOR-BLIND PEOPLE (TYPE D) | 59 | 1 | -3 |
| B | ELDERLY | 54 | -3 | 15 |
| C | GENERAL PEOPLE WITH NORMAL COLOR VISION (TYPE C) | 51 | 54 | 32 |
| C | COLOR-BLIND PEOPLE (TYPE P) | 57 | 4 | 9 |
| C | COLOR-BLIND PEOPLE (TYPE D) | 53 | 8 | 3 |
| C | ELDERLY | 52 | 11 | 43 |

FIG.6A

| VERIFICATION POINTS COMPARED | COLOR-VISION CHARACTERISTICS GROUP | COLOR DIFFERENCE ($\Delta E76$) | LIGHTNESS DIFFERENCE ($\Delta L$) |
|---|---|---|---|
| A/B | GENERAL PEOPLE WITH NORMAL COLOR VISION (TYPE C) | 95.7 | 10.0 |
| A/B | COLOR-BLIND PEOPLE (TYPE P) | 53.9 | 15.0 |
| A/B | COLOR-BLIND PEOPLE (TYPE D) | 58.6 | 4.0 |
| A/B | ELDERLY | 84.1 | 8.0 |
| A/C | GENERAL PEOPLE WITH NORMAL COLOR VISION (TYPE C) | 34.2 | 2.0 |
| A/C | COLOR-BLIND PEOPLE (TYPE P) | 41.4 | 13.0 |
| A/C | COLOR-BLIND PEOPLE (TYPE D) | 51.3 | 2.0 |
| A/C | ELDERLY | 59.1 | 6.0 |
| B/C | GENERAL PEOPLE WITH NORMAL COLOR VISION (TYPE C) | 62.9 | 8.0 |
| B/C | COLOR-BLIND PEOPLE (TYPE P) | 12.8 | 2.0 |
| B/C | COLOR-BLIND PEOPLE (TYPE D) | 11.0 | 6.0 |
| B/C | ELDERLY | 31.3 | 2.0 |

FIG.6B

| VERIFICATION POINT | COLOR-VISION CHARACTERISTICS GROUP | CORRECTION FACTOR | REFERENCE THRESHOLD (FOR COLOR DIFFERENCE) | REFERENCE THRESHOLD (FOR LIGHTNESS DIFFERENCE) | CORRECTED THRESHOLD (FOR COLOR DIFFERENCE) | CORRECTED THRESHOLD (FOR LIGHTNESS DIFFERENCE) |
|---|---|---|---|---|---|---|
| A | GENERAL PEOPLE WITH NORMAL COLOR VISION (TYPE C) | 0.9 | 30.0 | 15.0 | 27.0 | 13.5 |
| | COLOR-BLIND PEOPLE (TYPE P) | 1.1 | | | 33.0 | 16.5 |
| | COLOR-BLIND PEOPLE (TYPE D) | 1.2 | | | 36.0 | 18.0 |
| | ELDERLY | 1.25 | | | 37.5 | 18.75 |
| B | GENERAL PEOPLE WITH NORMAL COLOR VISION (TYPE C) | 0.75 | | | 22.5 | 11.25 |
| | COLOR-BLIND PEOPLE (TYPE P) | 1.2 | | | 36.0 | 18.0 |
| | COLOR-BLIND PEOPLE (TYPE D) | 1.25 | | | 37.5 | 18.75 |
| | ELDERLY | 1.2 | | | 36.0 | 18.0 |
| C | GENERAL PEOPLE WITH NORMAL COLOR VISION (TYPE C) | 0.8 | | | 24.0 | 12.0 |
| | COLOR-BLIND PEOPLE (TYPE P) | 1.2 | | | 36.0 | 18.0 |
| | COLOR-BLIND PEOPLE (TYPE D) | 1.2 | | | 36.0 | 18.0 |
| | ELDERLY | 1.25 | | | 37.5 | 18.75 |

FIG.7A

| VERIFICATION POINTS COMPARED | COLOR-VISION CHARACTERISTICS GROUP | THRESHOLD (FOR COLOR DIFFERENCE) | THRESHOLD (FOR LIGHTNESS DIFFERENCE) |
|---|---|---|---|
| A/B | GENERAL PEOPLE WITH NORMAL COLOR VISION (TYPE C) | 27.0 | 13.5 |
| | COLOR-BLIND PEOPLE (TYPE P) | 36.0 | 18.0 |
| | COLOR-BLIND PEOPLE (TYPE D) | 37.5 | 18.75 |
| | ELDERLY | 37.5 | 18.75 |
| A/C | GENERAL PEOPLE WITH NORMAL COLOR VISION (TYPE C) | 27.0 | 13.5 |
| | COLOR-BLIND PEOPLE (TYPE P) | 35.0 | 18.0 |
| | COLOR-BLIND PEOPLE (TYPE D) | 36.0 | 18.0 |
| | ELDERLY | 37.5 | 18.75 |
| B/C | GENERAL PEOPLE WITH NORMAL COLOR VISION (TYPE C) | 24.0 | 12.0 |
| | COLOR-BLIND PEOPLE (TYPE P) | 36.0 | 18.0 |
| | COLOR-BLIND PEOPLE (TYPE D) | 37.5 | 18.75 |
| | ELDERLY | 37.5 | 18.75 |

FIG.7B

| VERIFICATION POINTS COMPARED | COLOR-VISION CHARACTERISTICS GROUP | DETERMINATION OF COLOR-DIFFERENCE DISCRIMINABILITY | DETERMINATION OF LIGHTNESS-DIFFERENCE DISCRIMINABILITY | COMPREHENSIVE DETERMINATION |
|---|---|---|---|---|
| A/B | GENERAL PEOPLE WITH NORMAL COLOR VISION (TYPE C) | ◯ | | ✕ |
| | COLOR-BLIND PEOPLE (TYPE P) | ◯ | ◯ | |
| | COLOR-BLIND PEOPLE (TYPE D) | ◯ | ✕ | |
| | ELDERLY | ◯ | | |
| A/C | GENERAL PEOPLE WITH NORMAL COLOR VISION (TYPE C) | ◯ | ◯ | ◯ |
| | COLOR-BLIND PEOPLE (TYPE P) | ◯ | ◯ | |
| | COLOR-BLIND PEOPLE (TYPE D) | ◯ | ◯ | |
| | ELDERLY | ◯ | | |
| B/C | GENERAL PEOPLE WITH NORMAL COLOR VISION (TYPE C) | ◯ | ✕ | ✕ |
| | COLOR-BLIND PEOPLE (TYPE P) | ✕ | ✕ | |
| | COLOR-BLIND PEOPLE (TYPE D) | ✕ | ✕ | |
| | ELDERLY | ◯ | | |

INFORMATION PROCESSING APPARATUS AND NONVOLATILE STORAGE MEDIUM

CROSS-REFERENCE TO RELATED APPLICATIONS

This application is based upon and claims the benefit of priority from the prior Japanese Patent Application No. 2021-167140, filed 12 Oct., 2021 the entire content of which is incorporated herein by reference.

FIELD

An embodiment of the present invention relates to an information processing apparatus and a nonvolatile storage medium for verifying the chromatic discriminability of content such as documents, illustrations, and images.

BACKGROUND

Content such as documents, illustrations, and images is often represented as multicolored content. Making content multicolored is expected to improve its visibility and intuitiveness, and to further increase the amount of information. It is important that such content is easily visible to and provided without loss of information to color-blind people and the elderly, as well as general people with normal color vision.

There has been a desire to verify whether created content consists of a combination of colors discriminable to people in all color-vision characteristics groups, such as general people with normal color vision, color-blind people, and the elderly, that is, whether the content has chromatic discriminability.

Methods exist for assisting in designating colors in creating content. Unfortunately, no methods currently exist for appropriately verifying the chromatic discriminability of created content in an accurate but not too sensitive manner.

SUMMARY OF THE INVENTION

It is desired to verify the chromatic discriminability of created content, and to appropriately verify the chromatic discriminability in an accurate but not too sensitive manner.

An information processing apparatus for evaluating chromatic discriminability of content according to an embodiment includes:

a storage unit that stores a program and data, the data including first and second reference thresholds for use in determining color-difference discriminability, third and fourth reference thresholds for use in determining lightness-difference discriminability, and correction factors for correcting the first to fourth reference thresholds, each correction factor corresponding to one of a plurality of sets of Lab color space values; and a processor that executes the program, wherein the processor executes the program to implement:

a conversion unit that converts color space values of each of first and second verification points designated by a user on the content into Lab color space values;

a calculation unit that calculates a color difference and a lightness difference between the first and second verification points based on the Lab color space values;

a region determination unit that determines whether a region containing the first verification point and a region containing the second verification point are adjoining or apart, based on color space values of the content;

a selection unit that selects one of the first and second reference thresholds and one of the third and fourth reference thresholds based on a result of determining whether the regions are adjoining or apart;

a correction unit that corrects each of the one of the first and second reference thresholds selected and the one of the third and fourth reference thresholds selected, using the correction factor corresponding to the Lab color space values of one of the first and second verification points; and a discriminability determination unit that determines color-difference discriminability by comparing the color difference between the first and second verification points with the one of the first and second reference thresholds corrected, and determines lightness-difference discriminability by comparing the lightness difference between the first and second verification points with the one of the third and fourth reference thresholds corrected.

DETAILED DESCRIPTION

An information processing apparatus according to an embodiment will be described below with reference to the drawings.

In this embodiment, colors are expressed by values in the Lab color space value. As is well known, perceptual darkness is expressed by the lightness index value L, and hue and chroma are expressed by the values a and b, which are called chromaticness indices. The lightness difference ΔL between two colors is given as the difference between the values L of the two colors. The color difference between two colors, which is the perceptual difference between the two colors quantified with the values L, a, and b, is provided by various indices. For example, the simplest index is ΔE76, which is given as the distance between two color points in the Lab color space. As another example, the color difference between two colors is given by ΔE00, which defines a formula such that color differences obtained based on the formula approximate the color perception range of the human eye in the Lab color space. This formula is well known and therefore not described here. Any of various indices may be used as the color difference in this embodiment. Examples of content for which chromatic discriminability is verified in this embodiment include documents, graphs, illustrations, and images. Such content may be represented by values in any color space value, such as the RGB or CMYK color space value. For convenience, the description here assumes that content is represented by values in the RGB color space value.

Figure 1:
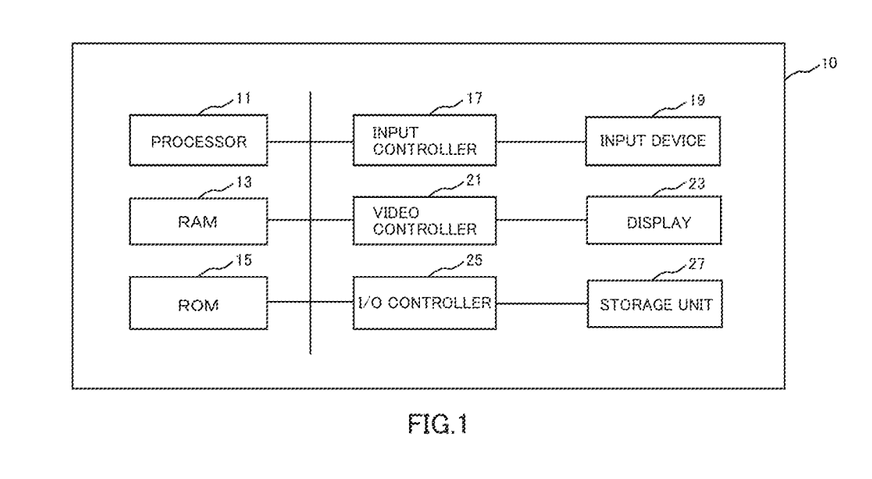
FIG. 1 is a diagram illustrating the configuration of an information processing apparatus according to an embodiment.
Figure 2A:
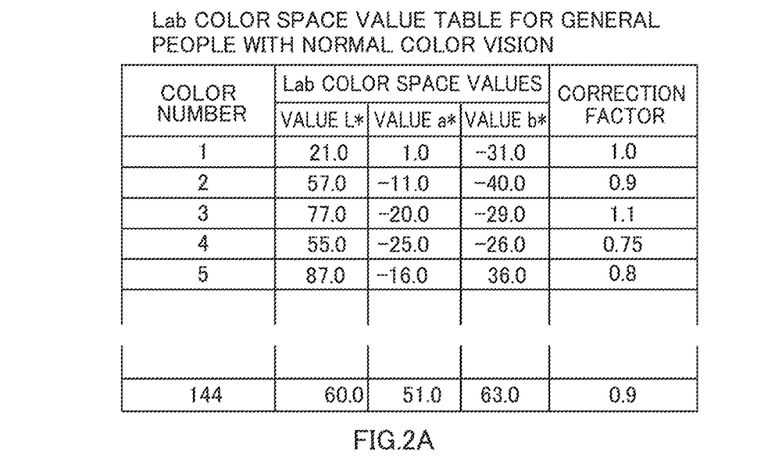
FIGS. 2A, 2B, 2C, and 2D are diagrams illustrating Lab tables for general people with normal color vision, color-blind people (type P), color-blind people (type D), and the elderly, respectively, stored in a storage unit in FIG. 1.
Figure 2B:
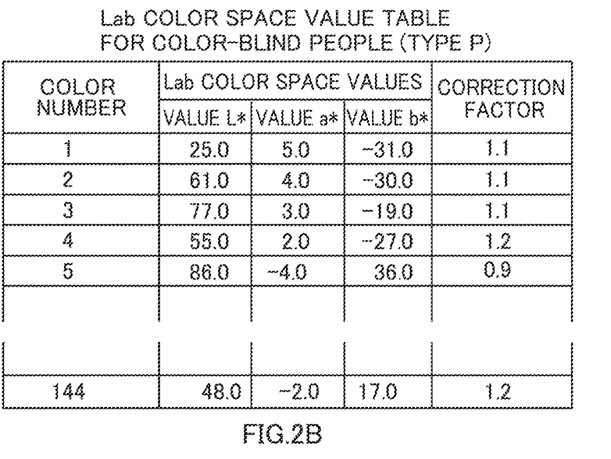
Figure 2C:
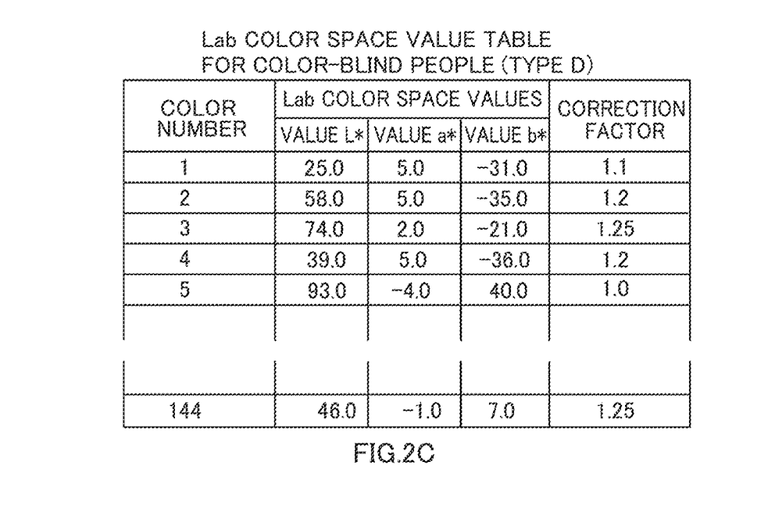
Figure 2D:
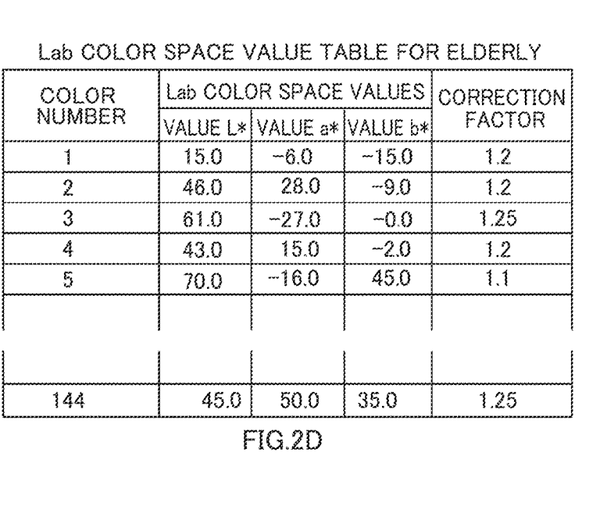

FIG. 1 is a block diagram illustrating the configuration of an information processing apparatus 10 according to this embodiment. The information processing apparatus 10 includes a processor 11, a RAM 13, a ROM 15, an input controller 17, an input device 19, a video controller 21, a display 23, an I/O controller 25, and a storage unit 27. The processor 11 may include, for example, a central processing unit (CPU) and a graphics processing unit (GPU). The RAM 13 may function as the main memory and the work area for the processor 11. The processor 11 implements various operations by loading programs and other items required for processing from the ROM 15 or the storage unit 27 into the RAM 13 and executing the programs. The ROM 15 or the storage unit 27 stores therein the basic input output system (BIOS) to be executed by the processor 11, an operating system program (OS), the code of a program for performing chromatic discriminability verification processing, and various data items required for the program, which will be described in detail below.

The input controller 17 controls input from the input device 19, which may be a keyboard (KB) or a pointing device such as a mouse or a touch panel. The video controller 21 controls display on the display 23, which may be a liquid crystal display (LCD), under the control of the processor 11. The I/O controller 25 controls access to the storage unit 27.

FIGS. 2A, 2B, 2C, and 2D illustrate Lab color space value tables stored in the storage unit 27. For each of color numbers, the Lab color space value tables include a corresponding set of the value L*, the value a*, and the value b* (hereafter simply denoted as the value L, the value a, and the value b) and a corresponding correction factor for correcting reference thresholds for use in chromatic discriminability determination. The tables are configured for respective color-vision characteristics groups, such as general people with normal color vision, color-blind people (type P), color-blind people (type D), and the elderly. As is well known, the value L expresses the lightness of a color. The value a expresses a position between red/magenta and green, and the value b expresses a position between yellow and blue. The values a and b define the hue.

The correction factor is predetermined for each hue in each color-vision characteristics group. As will be described in detail below, color-difference discriminability may be determined as follows, for example. The color difference between two verification points is compared with a threshold. If the color difference exceeds the threshold, it is determined that the two verification points or two regions containing the respective verification points have color-difference discriminability therebetween that allows discrimination between the colors. If the color difference is smaller than or equal to the threshold, it is determined that the two verification points or regions have no color-difference discriminability therebetween. For stricter determination of the color-difference discriminability, a higher threshold is required. Here, the inventor has discovered that the color-difference discriminability depends not only on the color-vision characteristics group but also on the hue. This also applies to lightness-difference discriminability. Thus, the accuracy of determining the color-difference discriminability and the lightness-difference discriminability can be improved by varying the thresholds according to not only the color-vision characteristics group but also the hue. To this end, each color-vision characteristics group is assigned corresponding reference thresholds, and each hue in each group is assigned a corresponding correction factor for correcting the reference thresholds.

Figure 3A:
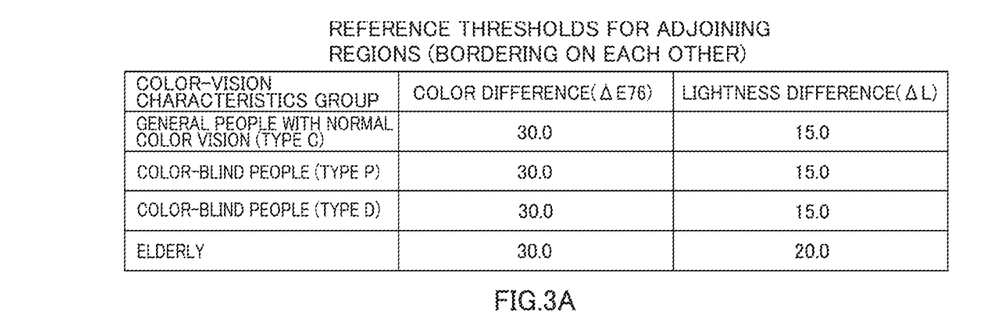
FIGS. 3A and 3B are diagrams illustrating a reference threshold table for adjoining regions and a reference threshold table for regions located apart, stored in the storage unit in FIG. 1.
Figure 3B:
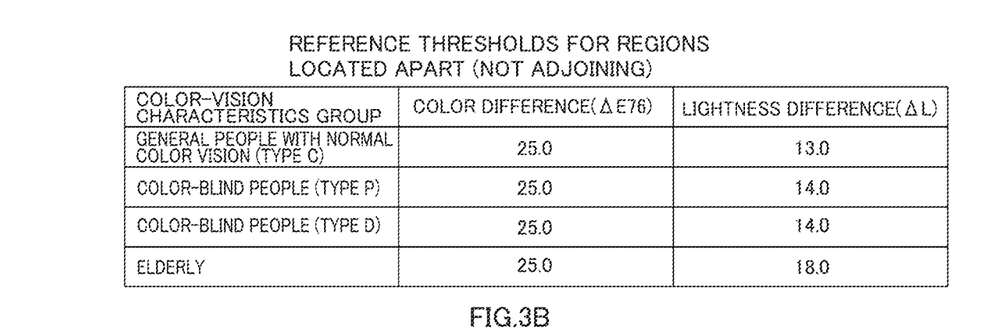

FIG. 3 illustrates reference threshold tables stored in the storage unit 27. Each reference threshold table includes, for each of the color-vision characteristics groups such as general people with normal color vision, color-blind people (type P), color-blind people (type D), and the elderly, a corresponding reference threshold for determining the color-difference discriminability and a corresponding reference threshold for determining the lightness-difference discriminability. Here, the inventor has discovered that the color-difference discriminability and the lightness-difference discriminability perceived by humans depend on whether the regions are adjoining (bordering on each other) or apart (not adjoining, with another region interposed therebetween). The color-difference discriminability and the lightness-difference discriminability are both lower between adjoining regions than between regions located apart. Therefore, for two regions each containing a verification point, two reference threshold tables are provided: a reference threshold table for adjoining regions (FIG. 3A) and a reference threshold table for non-adjoining regions, i.e., regions located apart with another region interposed therebetween (FIG. 3B). Either one of these tables is used depending on whether the regions are adjoining or apart. Specifically, the thresholds for the color difference and the lightness difference applied to adjoining regions are set higher than those applied to regions located apart. This improves the accuracy of determining the color-difference discriminability and the lightness-difference discriminability. It is to be noted that the reference thresholds for the color difference illustrated in FIG. 3A are first reference thresholds; the reference thresholds for the color difference illustrated in FIG. 3B are second reference thresholds; the reference thresholds for the lightness difference illustrated in FIG. 3A are third reference thresholds; and the reference thresholds for the lightness difference illustrated in FIG. 3B are fourth reference thresholds.

Figure 4:
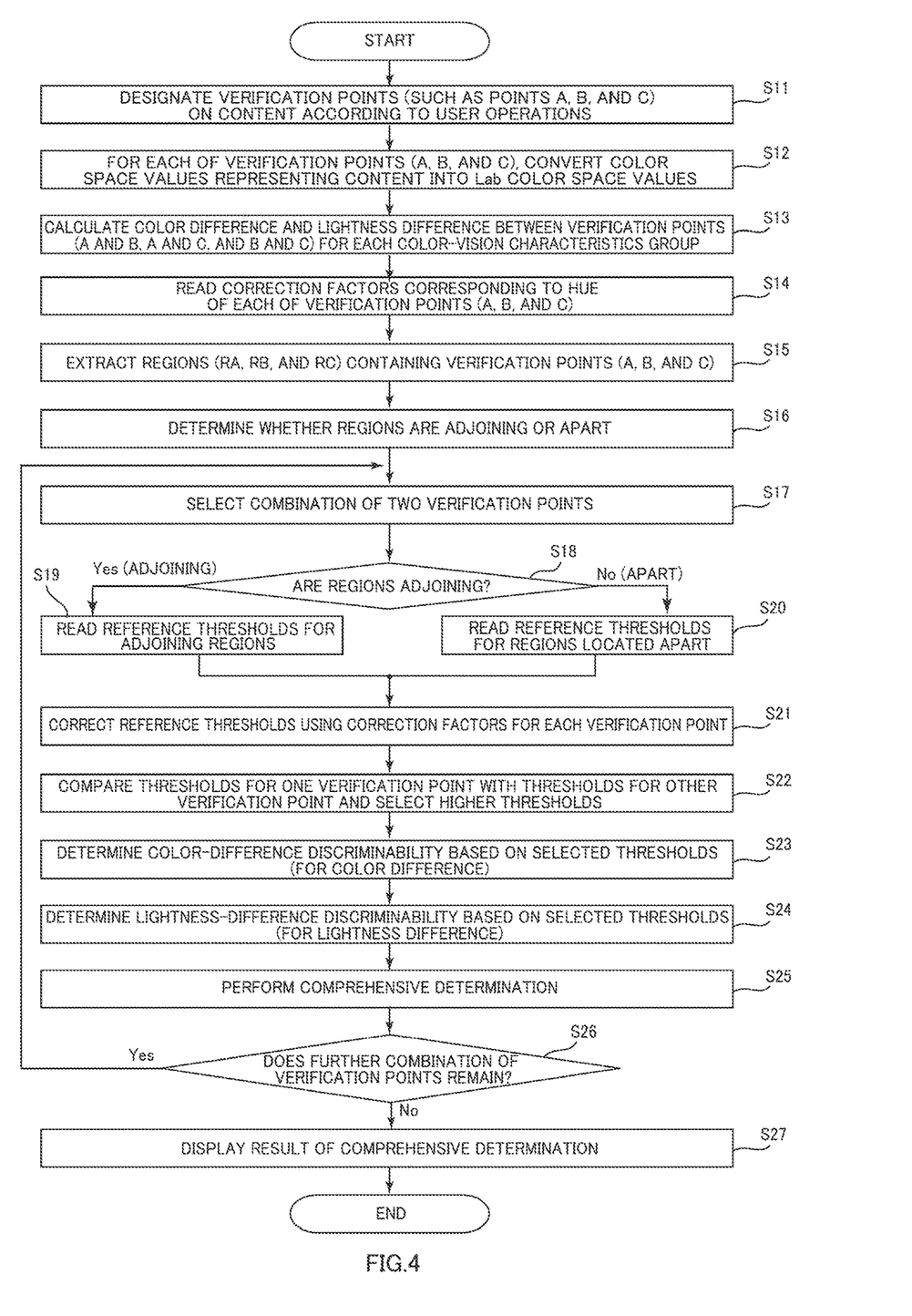
FIG. 4 is a flowchart illustrating the flow chart steps of chromatic discriminability verification processing according to the embodiment.

FIG. 4 illustrates chromatic discriminability verification processing according to this embodiment. The code of a program for performing the chromatic discriminability verification processing is read from the storage unit 27 to the RAM 13, and the processor 11 executes the program to implement means for the chromatic discriminability verification processing.

Figure 5:
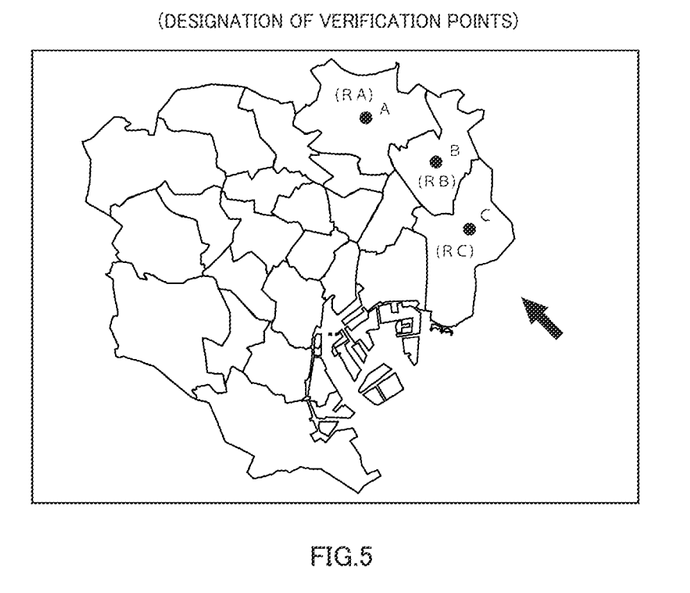
FIG. 5 is a diagram illustrating an example of verification points designated at step S11 in FIG. 4.

At step S11, an operator operates the input device 19 to designate verification points at desired positions on content. It is assumed here that three verification points A, B, and C are designated as illustrated in FIG. 5. In the following processing, chromatic discriminability is determined between two points in all combinations out of the three verification points A, B, and C (A and B, A and C, and B and C).

Figure 6A:
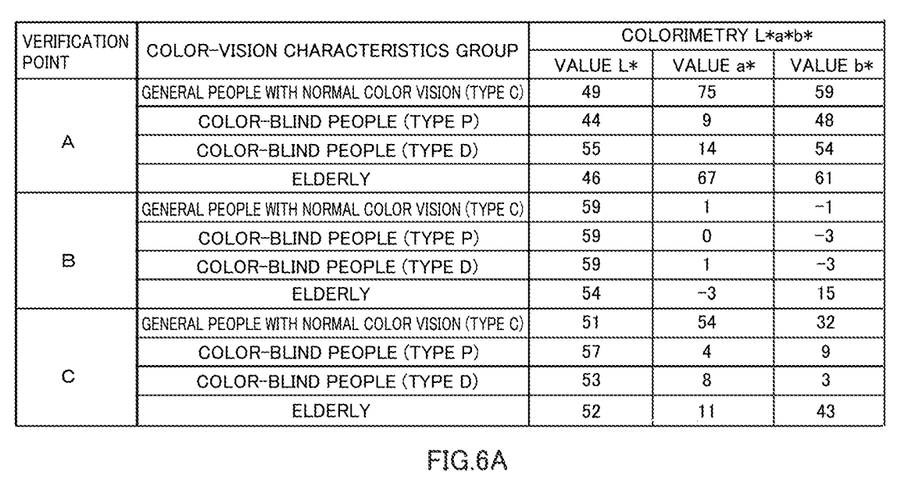
FIGS. 6A and 6B are diagrams illustrating an example of values L, a, and b of each of verification points A, B, and C identified at step S12 in FIG. 4 for each color-vision characteristics group, and color differences and lightness differences between verification points (A and B, A and C, and B and C) calculated at step S13 in FIG. 4 for each color-vision characteristics group.
Figure 6B:
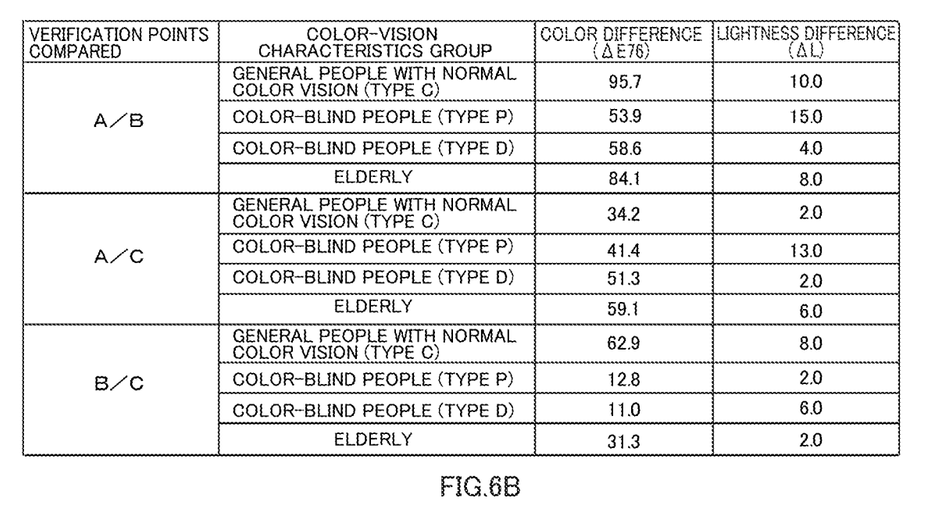

At step S12, as illustrated in FIG. 6A, the values of each of the verification points A, B, and C on the content are converted, for example from RGB color space values into Lab color space values. This conversion is performed for each of color-vision characteristics groups, such as general people with normal color vision, color-blind people (type P), color-blind people (type D), and the elderly. At step S13, as illustrated in FIG. 6B, the color difference and the lightness difference between the two verification points in each combination (A and B, A and C, and B and C) are calculated for each color-vision characteristics group, based on the Lab color space values of the verification points A, B, and C. The color difference between two points, which is the perceptual difference between two colors quantified with the values L, a, and b of each point, is provided by various indices. For example, the simplest index is ΔE76, which is given as the distance between two color points in the Lab color space. The color difference may be calculated by various methods, which are well known and therefore not described here. The lightness difference between two points is calculated as the difference between the values L of the two points.

Figure 7A:
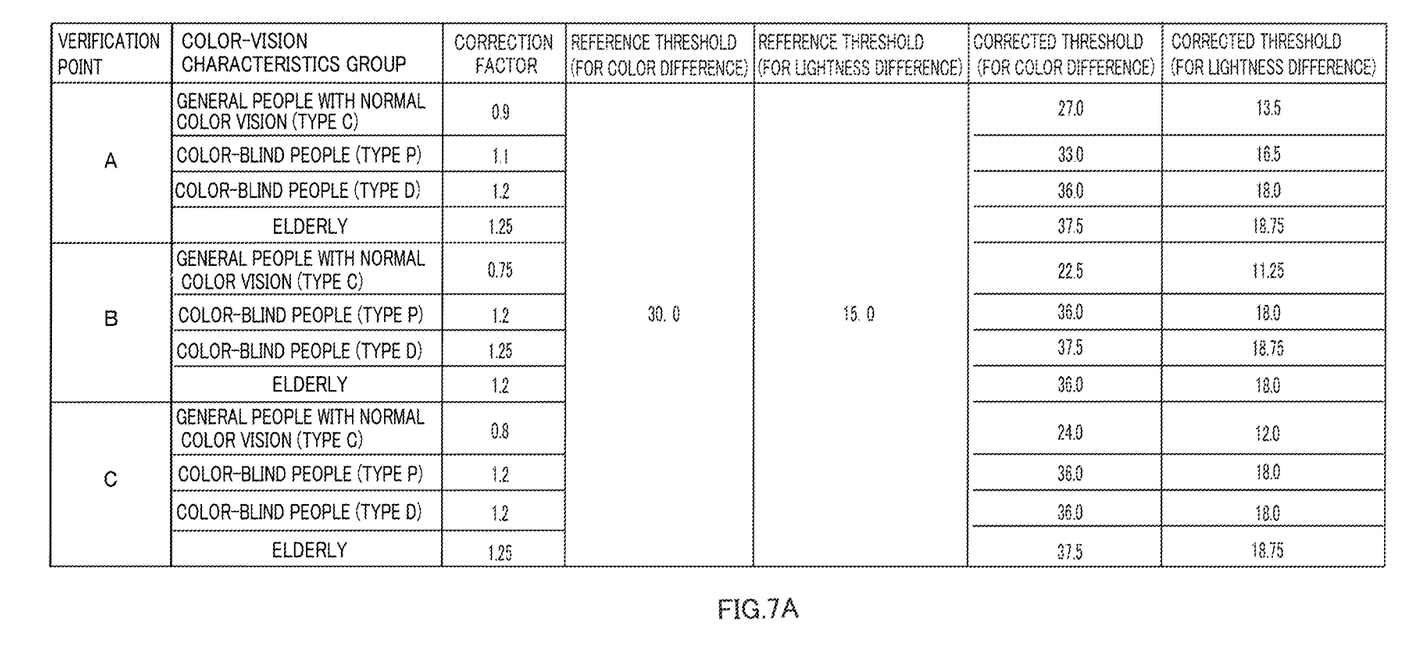
FIGS. 7A and 7B are diagrams illustrating an example of correction factors for each of the verification points A, B, and C read at step S14 in FIG. 4 for the respective color-vision characteristics groups, reference thresholds read at step S20 in FIG. 4, thresholds corrected at step S21 in FIG. 4, and thresholds selected for each combination of verification points (A and B, A and C, and B and C)

At step S14, as illustrated in FIG. 7A, the Lab color space value tables are referred to based on the Lab color space values of the verification points A, B, and C. Correction factors corresponding to each of the verification points A, B, and C are read from the storage unit 27 to the RAM 13 for the respective color-vision characteristics groups.

At step S15, regions RA, RB, and RC containing the respective verification points A, B, and C are extracted. Any method may be used to extract the regions. For example, the content may be binarized using, as thresholds, the RGB color space values of the verification points A, B, and C or approximations of these values. Then, closed spaces containing the verification points A, B, and C may be extracted as the regions RA, RB, and RC containing the respective verification points A, B, and C.

At step S16, for each combination of two of the regions RA, RB, and RC containing the respective verification points A, B, and C (i.e., the regions RA and RB, the regions RA and RC, and the regions RB and RC), it is determined whether the regions are adjoining (bordering on each other) or apart (not adjoining, with another region interposed therebetween). For example, the regions RA, RB, and RC may be expanded to compare the number of pixels in overlapping portions with a predetermined threshold. If the number of pixels in the overlapping portions exceeds the threshold, the regions may be determined to be adjoining. Otherwise, the regions may be determined to be apart.

At step S17, a combination of two of the verification points A, B, and C is selected. For example, the verification points A and B are selected. At step S18, it is determined, according to the determination at step S16, whether the regions RA and RB of the selected verification points A and B are adjoining or apart. If the regions are adjoining (Yes), a reference threshold (for the color difference) and a reference threshold (for the lightness difference) for adjoining regions as illustrated in FIG. 3A are read for each of the two verification points A and B and for each color-vision characteristics group (step S19). If the regions are apart (No), a reference threshold (for the color difference) and a reference threshold (for the lightness difference) for regions located apart as illustrated in FIG. 3B are read for each of the two verification points A and B and for each color-vision characteristics group (step S20).

The reference thresholds for adjoining regions are different from the reference thresholds for regions located apart. Typically, the reference thresholds for adjoining regions are set higher than the reference thresholds for regions located apart, and the reference thresholds for regions located apart are set lower than the reference thresholds for adjoining regions. The color-difference discriminability and the lightness-difference discriminability are determined more strictly for adjoining regions than for non-adjoining regions. Because non-adjoining regions have another region interposed therebetween, the discriminability may be determined somewhat more loosely for such regions than for adjoining regions. This enables avoiding too sensitive determination of the discriminability while maintaining high accuracy of the determination.

Figure 7B:
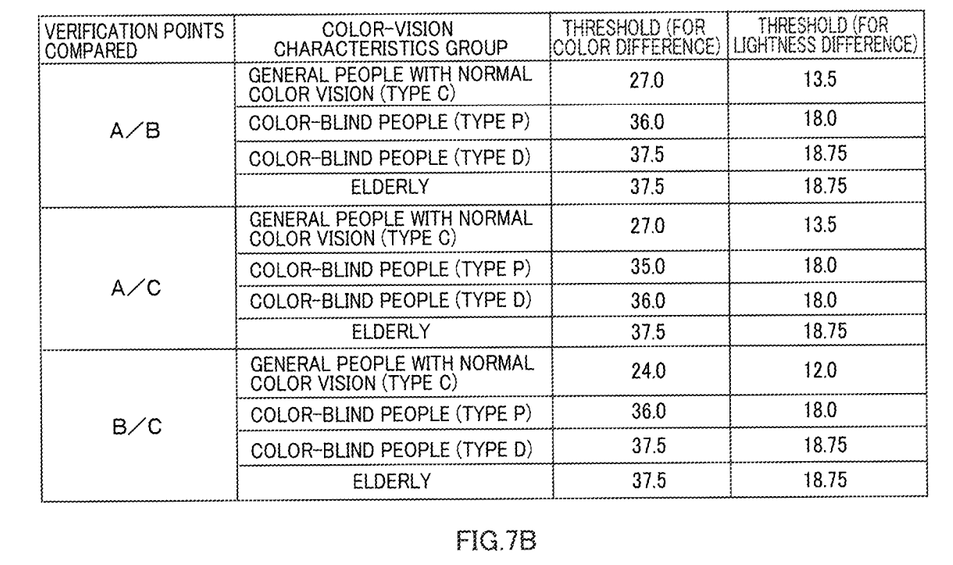

At step S21, for each of the verification points A and B, the reference threshold (for the color difference) and the reference threshold (for the lightness difference) for each color-vision characteristics group are corrected using the correction factor read at step S14. At step S22, as illustrated in FIG. 7B, the corrected color-difference reference threshold (a corrected reference threshold will simply be referred to as a threshold) for the verification point A is compared with the color-difference threshold for the verification point B in each color-vision characteristics group, and the higher one is selected. Similarly, the lightness-difference thresholds for the verification points A and B are compared with each other in each color-vision characteristics group, and the higher one is selected. Selecting the higher thresholds means more strictly and accurately determining the color-difference discriminability and the lightness-difference discriminability. However, selecting the lower ones of the thresholds for the verification points A and B is also possible.

Figure 8:
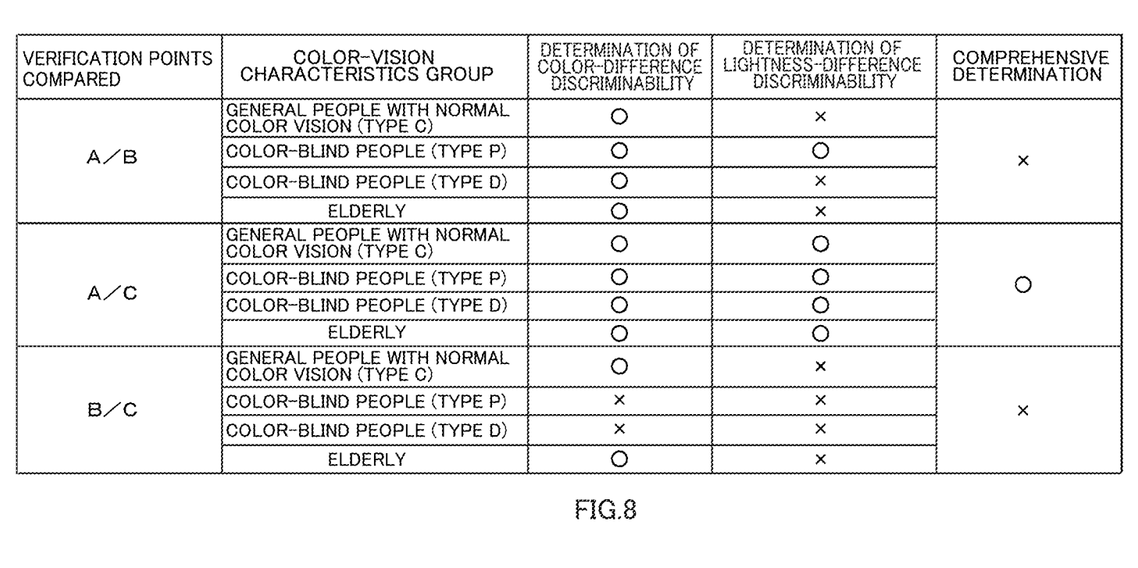
FIG. 8 is a diagram illustrating an example of the result of determination at steps S23 and S24 in FIG. 4, and the result of comprehensive determination at S25 in FIG. 4.

At step S23, as illustrated in FIG. 8, the color difference between the verification points A and B calculated at step S13 is compared with the selected threshold (for the color difference). If the color difference between the verification points A and B exceeds the threshold (for the color difference), it is determined that the verification points A and B has color-difference discriminability between them (indicated as "O"). If the color difference between the verification points A and B is smaller than or equal to the threshold (for the color difference), it is determined that the verification points A and B has no color-difference discriminability between them (indicated as "X"). This determination of the color-difference discriminability is performed for each color-vision characteristics group.

Similarly, at step S24, the lightness difference between the verification points A and B calculated at step S13 is compared with the selected threshold (for the lightness difference). If the lightness difference between the verification points A and B exceeds the threshold (for the lightness difference), it is determined that the verification points A and B has lightness-difference discriminability between them. If the lightness difference between the verification points A and B is smaller than or equal to the threshold (for the lightness difference), it is determined that the verification points A and B has no lightness-difference discriminability between them. This determination of the lightness-difference discriminability is performed for each color-vision characteristics group.

At step S25, as illustrated in FIG. 8, comprehensive discriminability between the verification points A and B is determined from the color-difference discriminability and the lightness-difference discriminability. If all the color-vision characteristics groups have both the color-difference discriminability and the lightness-difference discriminability, it is determined that the verification points A and B has comprehensive chromatic discriminability between them. If any of the color-vision characteristics groups lacks one or both of the color-difference discriminability and the lightness-difference discriminability, it is determined that the verification points A and B has no comprehensive chromatic discriminability between them.

If a further combination of verification points remains at step S26, the process returns to step S17, where steps S17 to S25 are performed for the combination of verification points to determine the comprehensive chromatic discriminability between the verification points. In the present case, the comprehensive chromatic discriminability is determined between the verification points A and C and between the verification points B and C.

Figure 9:
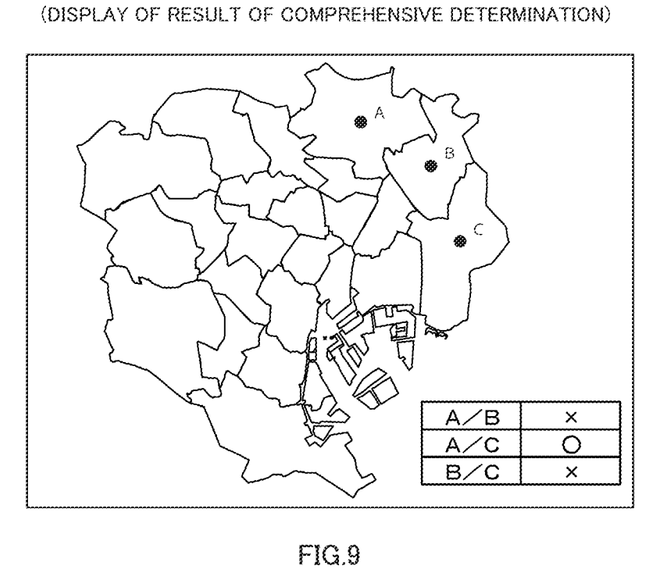
FIG. 9 is a diagram illustrating an example of display of the result of comprehensive determination at step S25 in FIG. 4.

If step S26 results in No, that is, when the determination of the comprehensive chromatic discriminability is completed for all the combinations of the verification points, the process proceeds to step S27. At step S27, the result of the determination of the comprehensive chromatic discriminability for all the combinations of the verification points is displayed on the content as illustrated in FIG. 9, for example in the form of a table.

As above, according to this embodiment, the chromatic discriminability of created content can be comprehensively verified from the perspectives of both the color difference and the lightness difference, and further across multiple color-vision characteristics groups such as general people with normal color vision, color-blind people (type P), color-blind people (type D), and the elderly. The accuracy of the verification can be improved by determining the chromatic discriminability between verification points in different regions using thresholds that depend on whether the regions are adjoining or apart. The accuracy of the verification can be further improved by correcting reference thresholds using correction factors corresponding to hues (the values a and b).

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An information processing apparatus for evaluating chromatic discriminability of content, comprising:
   a storage unit that stores a program and data, the data including first and second reference thresholds for use in determining color-difference discriminability, third and fourth reference thresholds for use in determining lightness-difference discriminability, and correction factors for correcting the first to fourth reference thresholds, each correction factor corresponding to one of a plurality of sets of Lab color space values; and
   a processor that executes the program,
   wherein the processor executes the program to implement:
   a conversion unit that converts color space values of each of first and second verification points designated by a user on the content into Lab color space values;
   a calculation unit that calculates a color difference and a lightness difference between the first and second verification points based on the Lab color space values;
   a region determination unit that determines whether a region containing the first verification point and a region containing the second verification point are adjoining or apart, based on color space values of the content;
   a selection unit that selects one of the first and second reference thresholds and one of the third and fourth reference thresholds based on a result of determining whether the regions are adjoining or apart;
   a correction unit that corrects each of the one of the first and second reference thresholds selected and the one of the third and fourth reference thresholds selected, using the correction factor corresponding to the Lab color space values of one of the first and second verification points; and
   a discriminability determination unit that determines color-difference discriminability by comparing the color difference between the first and second verification points with the one of the first and second reference thresholds corrected, and determines lightness-difference discriminability by comparing the lightness difference between the first and second verification points with the one of the third and fourth reference thresholds corrected.

2. The information processing apparatus according to claim 1, wherein the processor further implements
   a comprehensive determination unit that determines comprehensive chromatic discriminability between the first and second verification points based on a result of determining the color-difference discriminability and a result of determining the lightness-difference discriminability.

3. The information processing apparatus according to claim 1, wherein the first to fourth reference thresholds are provided for each of groups of general people with normal color vision, color-blind people, and elderly people.

4. The information processing apparatus according to claim 2, wherein the correction factors are provided for each of groups of general people with normal color vision, color-blind people, and elderly people.

5. The information processing apparatus according to claim 4, wherein
   the conversion unit converts the color space values into the Lab color space values for each of groups of general people with normal color vision, color-blind people, and elderly people,
   the calculation unit calculates the color difference and the lightness difference between the first and second verification points based on the Lab color space values for each of the groups of the general people with normal color vision, the color-blind people, and the elderly people,
   the correction unit corrects each of the one of the first and second reference thresholds and the one of the third and fourth reference thresholds using the correction factor for each of the groups of the general people with normal color vision, the color-blind people, and the elderly people,
   the discriminability determination unit determines the color-difference discriminability for each of the groups of the general people with normal color vision, the color-blind people, and the elderly people, and determines the lightness-difference discriminability for each of the groups of the general people with normal color vision, the color-blind people, and the elderly people, and the comprehensive determination unit determines that the first and second verification points have comprehensive chromatic discriminability between the first and second verification points if all of the groups of the general people with normal color vision, the color-blind people, and the elderly people have the color-difference discriminability and the lightness-difference discriminability.

6. An information processing apparatus for evaluating chromatic discriminability of content, comprising:

a conversion unit that converts color space values of each of first and second verification points on the content into Lab color space values;

a calculation unit that calculates a color difference and a lightness difference between the first and second verification points based on the Lab color space values; and a discriminability determination unit that determines color-difference discriminability by comparing the color difference between the first and second verification points with a color-difference threshold, and determines lightness-difference discriminability by comparing the lightness difference between the first and second verification points with a lightness-difference threshold, wherein each of the color-difference threshold and the lightness-difference threshold is set to a value that depends on whether a region containing the first verification point and a region containing the second verification point are adjoining or not.

7. A computer-readable nonvolatile storage medium having stored therein a program for causing a computer to implement:

converting color space values of each of first and second verification points designated by a user on content into Lab color space values;

calculating a color difference and a lightness difference between the first and second verification points based on the Lab color space values;

determining whether a region containing the first verification point and a region containing the second verification point are adjoining or apart, based on color space values of the content;

selecting one of first and second reference thresholds and one of third and fourth reference thresholds based on a result of determining whether the regions are adjoining or apart;

correcting each of the one of the first and second reference thresholds selected and the one of the third and fourth reference thresholds selected, using a correction factor corresponding to the Lab color space values of one of the first and second verification points; and determining color-difference discriminability by comparing the color difference between the first and second verification points with the one of the first and second reference thresholds corrected, and determining lightness-difference discriminability by comparing the lightness difference between the first and second verification points with the one of the third and fourth reference thresholds corrected.

8. A computer-readable nonvolatile storage medium having stored therein a program for causing a computer to implement:

converting color space values of each of first and second verification points on content into Lab color space values;

calculating a color difference and a lightness difference between the first and second verification points based on the Lab color space values;

determining color-difference discriminability by comparing the color difference between the first and second verification points with a color-difference threshold, and determining lightness-difference discriminability by comparing the lightness difference between the first and second verification points with a lightness-difference threshold; and setting each of the color-difference threshold and the lightness-difference threshold to a value that depends on whether a region containing the first verification point and a region containing the second verification point are adjoining or apart.

* * * * *